(12) United States Patent
Harrison

(10) Patent No.: US 7,081,887 B2
(45) Date of Patent: Jul. 25, 2006

(54) METHOD AND APPARATUS FOR POSITIONING A SOFTWARE KEYBOARD

(75) Inventor: Edward R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 10/325,163

(22) Filed: Dec. 19, 2002

(65) Prior Publication Data

US 2004/0119750 A1    Jun. 24, 2004

(51) Int. Cl.
G09G 5/00       (2006.01)

(52) U.S. Cl. .................. 345/173; 345/168; 345/169; 345/176

(58) Field of Classification Search ........... 345/173, 345/182, 87, 156, 168, 176, 630, 773, 1.1, 345/169, 673; 382/189, 311; 340/712, 707; 178/18, 19; 235/462.13; 701/207
See application file for complete search history.

(56) References Cited

U.S. PATENT DOCUMENTS

| | | | | |
|---|---|---|---|---|
| 5,021,640 A * | 6/1991 | Muroi | .................. | 235/462.13 |
| 5,379,057 A * | 1/1995 | Clough et al. | .............. | 345/173 |
| 5,936,614 A * | 8/1999 | An et al. | .................... | 345/173 |
| 6,002,799 A * | 12/1999 | Sklarew | ...................... | 382/189 |
| 6,078,314 A * | 6/2000 | Ahn | ........................... | 345/169 |
| 6,388,657 B1 * | 5/2002 | Natoli | ........................ | 345/168 |
| 6,421,042 B1 * | 7/2002 | Omura et al. | ............... | 345/157 |
| 6,600,480 B1 * | 7/2003 | Natoli | ........................ | 345/168 |
| 6,760,009 B1 * | 7/2004 | Omura et al. | ............... | 345/157 |
| 6,894,661 B1 * | 5/2005 | Tuli | ........................... | 345/1.1 |
| 2002/0063691 A1* | 5/2002 | Rogers et al. | ............. | 345/168 |
| 2002/0085038 A1* | 7/2002 | Cobbley et al. | ............ | 345/773 |
| 2002/0130844 A1* | 9/2002 | Natoli | ........................ | 345/168 |
| 2002/0190946 A1* | 12/2002 | Metzger | ..................... | 345/156 |
| 2003/0001825 A1* | 1/2003 | Omura et al. | ............... | 345/173 |
| 2003/0158655 A1* | 8/2003 | Obradovich et al. | ........ | 701/207 |
| 2004/0080487 A1* | 4/2004 | Griffin et al. | ............... | 345/156 |
| 2004/0174341 A1* | 9/2004 | Gershuni | ..................... | 345/168 |
| 2004/0207646 A1* | 10/2004 | Cote | .......................... | 345/630 |
| 2004/0212595 A1* | 10/2004 | Zhou | ......................... | 345/168 |

\* cited by examiner

Primary Examiner—Bipin Shalwala
Assistant Examiner—Prabodh Dharia
(74) Attorney, Agent, or Firm—Blakely, Sokoloff, Taylor & Zafman LLP

(57) ABSTRACT

A method and apparatus for positioning a software keyboard are described herein. In one embodiment of the invention, the method includes determining a screen touch location indicating where a touch screen display device was last touched. The method also includes determining a bounding region corresponding to an area on the touch screen display device based on the screen touch location and displaying a software keyboard outside the bounding region on the touch screen display device.

15 Claims, 10 Drawing Sheets

METHOD AND APPARATUS FOR POSITIONING A SOFTWARE KEYBOARD

FIELD OF THE INVENTION

Embodiments of the invention relate to the field of computer software, and more specifically software keyboards.

BACKGROUND OF THE INVENTION

Traditionally, many computer systems use standard hardware keyboards as their primary text input devices. However, software keyboards are becoming more popular because of the growing popularity of touch screens (also called touch-sensitive displays). Touch screens are display devices designed with a pressure sensitive panel mounted in front of the screen, which detects where users have touched the screen. Typically, software keyboards provide the same functionality as hardware keyboards with the main difference being that software keyboards are graphically embodied on a touch screen.

Software keyboards are relatively well suited for compact portable devices because they facilitate text input without needing relatively large standard hardware keyboards. Because personal digital assistants are compact and portable, they typically employ software keyboards, instead of larger hardware keyboards. In many personal digital assistants, where typically application programs are not multitasked, software application programs such as calendars, address books, and notepads control placement of a software keyboard. For example, when a calendar application program is executed, it displays the software keyboard at the bottom of the touch screen display device. When software application programs control the placement of software keyboards, typically the software keyboards will not overlay the application program's input space, making the software keyboard relatively easy to use.

However, with the emergence of different and relatively more sophisticated portable computing devices, application programs are less frequently designed to control the placement of software keyboards. For example, web tablets and other similar devices provide multitasking environments, wherein multiple software application programs can run simultaneously. In a multitasking environment, numerous application programs (e.g., web browsers, word processors, email programs, etc.) are launched and/or dragged to arbitrary places on the desktop. As a result, application program input spaces (e.g., text boxes) can appear at arbitrary desktop locations. One disadvantage of such an environment is that the software keyboards often obscure application programs input spaces, requiring the user to move the software keyboard before entering text into the input space. More specifically, for example, when a software keyboard obscures an application program's input space, the user must manually drag the software keyboard away from the input space. When touch screens require the use of a stylus, users must pick up a stylus before dragging software keyboard away from an input space. The constant need for picking up a stylus and and/or dragging the software keyboard away from application program input spaces drastically hinders the efficiency with which text input it is provided to application programs. Moreover, it makes the user experience less pleasant.

BRIEF DESCRIPTION OF THE DRAWINGS

The present invention is illustrated by way of example and not limitation in the Figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, block diagrams illustrate exemplary embodiments of the invention. Also herein, flow diagrams illustrate operations of the exemplary embodiments of the invention. The operations of the flow diagrams will be described with references to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Figure 1:
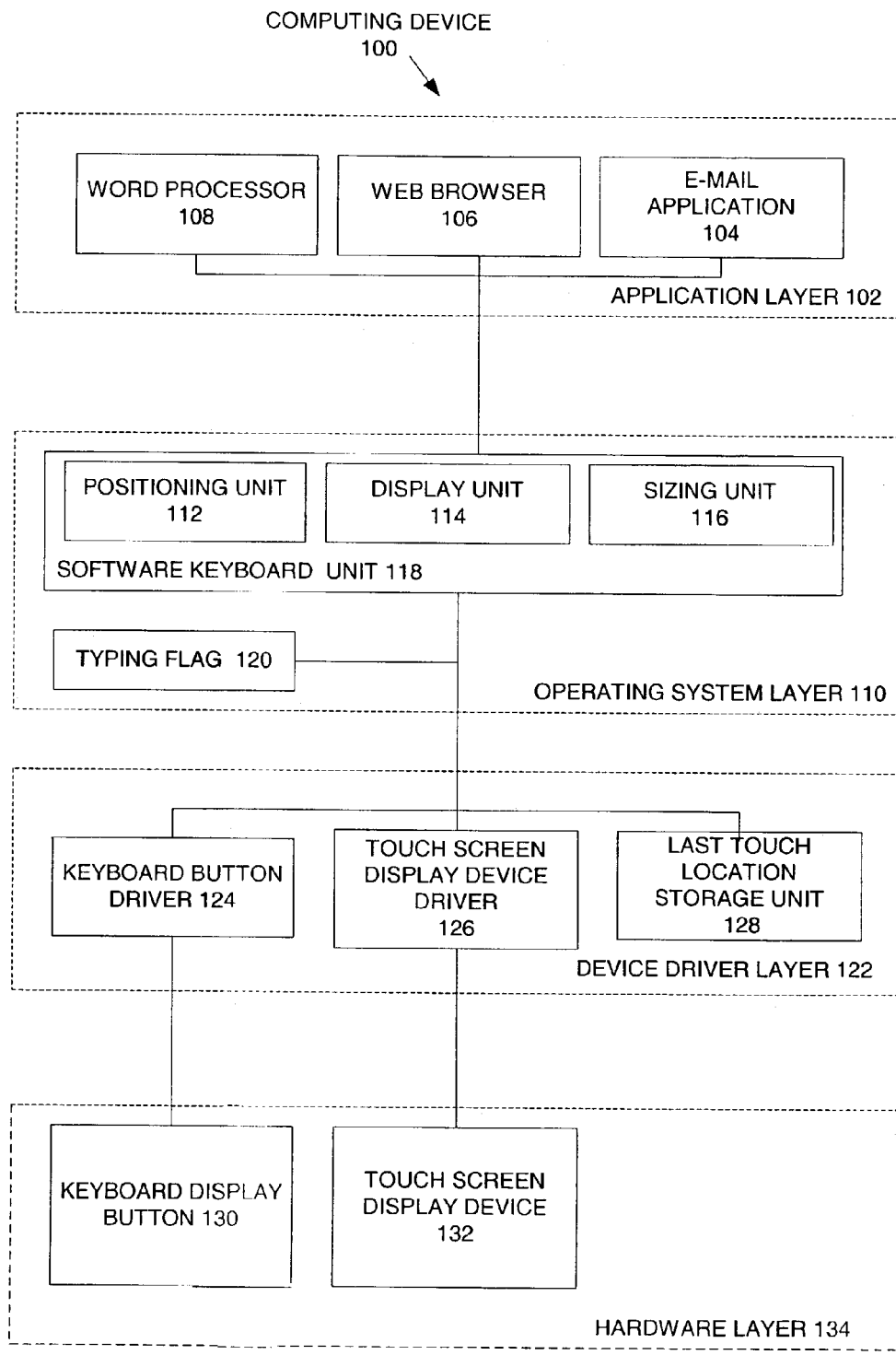
FIG. 1 is a block diagram illustrating hardware and software layers that control display and placement of a software keyboard, according to embodiments of the invention.

FIG. 1 is a block diagram illustrating hardware and software layers that control the display and placement of a software keyboard, according to embodiments of the invention. As shown in FIG. 1, the hardware and software layers of computing device 100 that control the display and placement of a software keyboard include an application layer 102, operative system layer 110, device driver layer 122, and hardware layer 134. In one embodiment of the invention, the computing device 100 is a web tablet. According to alternative embodiments of the invention, the computing device 100 can be a personal digital assistant, personal computer, notebook computer, or other suitable computing device. As shown in FIG. 1, the various software and hardware layers are interconnected.

The application layer 102 includes a word processor 108, a web browser 106, and an email application 104. In alternative embodiments of the invention, different application programs are included in the application layer 102. For example, the application layer 102 can include graphical design applications, MP3 players, spreadsheets, and any other suitable application programs. Each of the application programs included in the application layer 102 may communicate with the components of the operating system layer 110. The operating system layer 110 includes a software keyboard unit 118 and a typing flag 120, which is connected to a software keyboard unit 118. The software keyboard unit 118 includes a positioning unit 112, display unit 114, and sizing unit 116. The operating system layer components are connected to the device driver layer components. The device driver layer 122 includes a touch screen button driver 124, which is connected to a touch screen display device driver 26, which is connected to a last touch location storage unit 128. The touch screen button driver 124 and touch screen driver display device 126 are connected to components of the hardware layer 134, as shown in FIG. 1. The hardware layer 134 includes a keyboard display button 130 and a touch screen display device 132. In one embodiment of the invention, the keyboard display button 130 is a hardware keyboard button. For example, it is a hardware keyboard button located on a control panel or keypad. According to alternative embodiments of the invention, the display device is an LCD display, cathode ray tube, or other suitable display device.

Figure 2A:
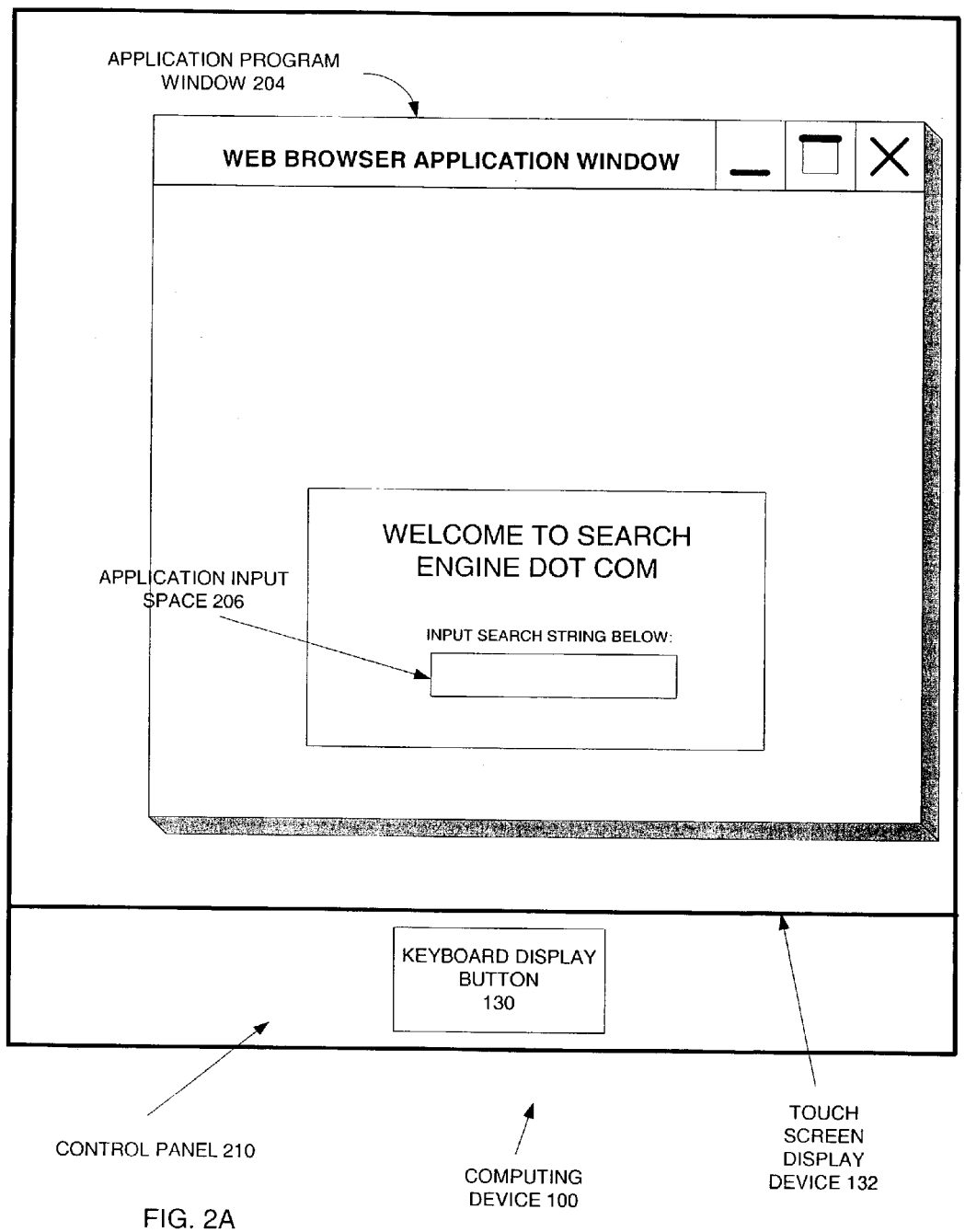
FIG. 2A is a block diagram illustrating an application program window displayed on a computing device, according to embodiments of the invention.
Figure 2B:
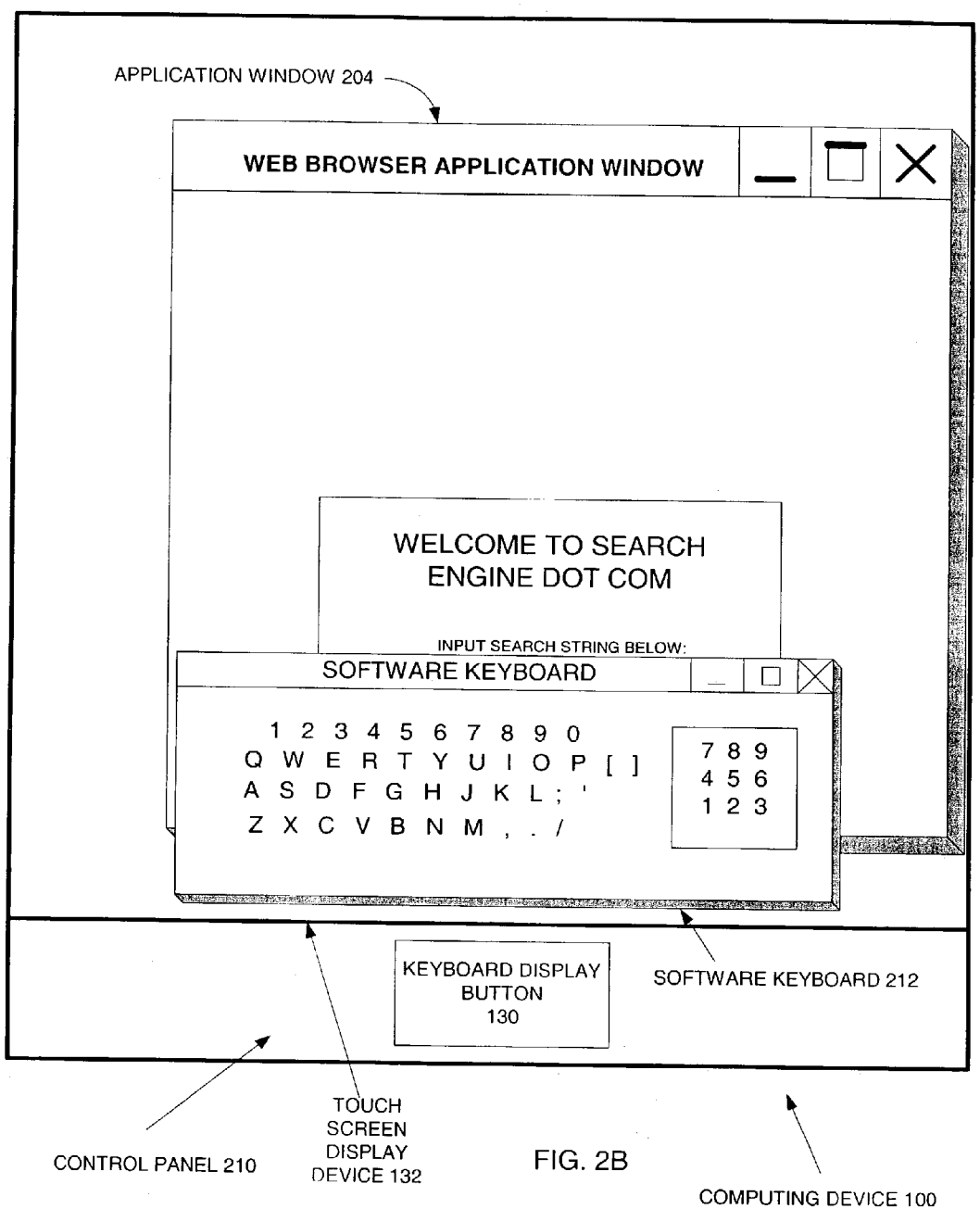
FIG. 2B is a block diagram illustrating a software keyboard displayed at a predetermined location on a touch screen of a computing device, according to embodiments of the invention.
Figure 3:
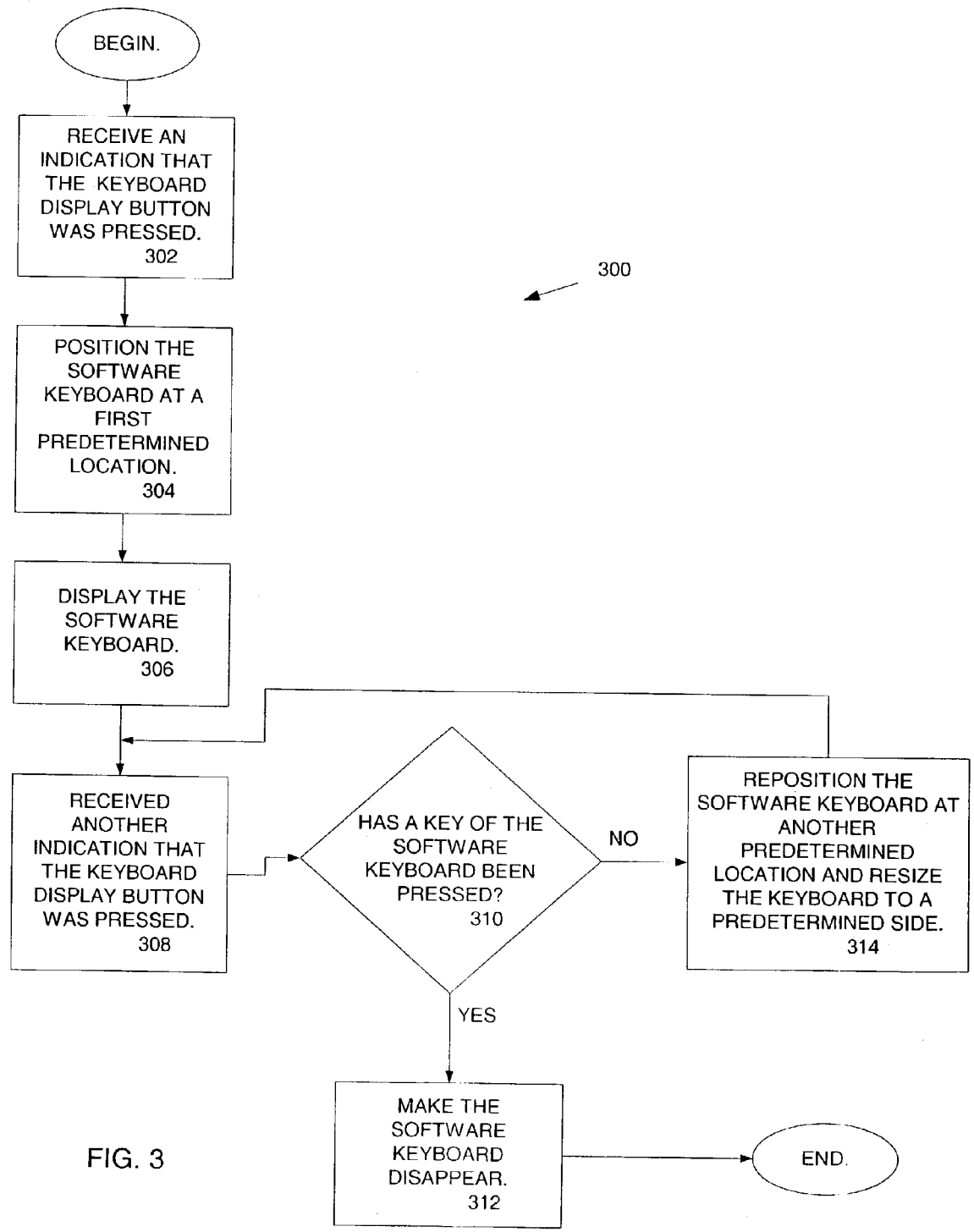
FIG. 3 is a flow diagram illustrating operations for positioning and displaying a software keyboard, according to embodiments of the invention.
Figure 4:
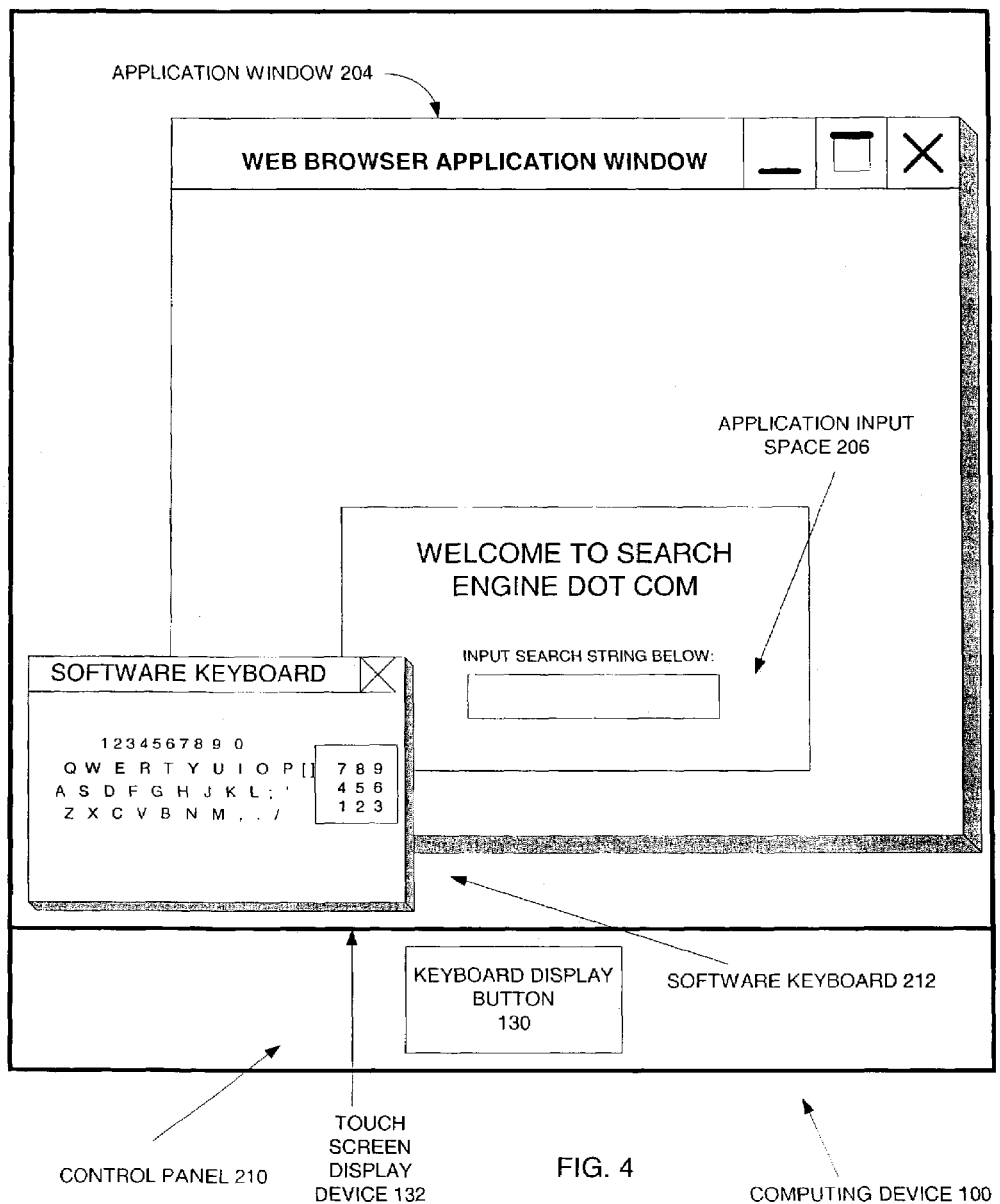
FIG. 4 is a block diagram illustrating a software keyboard resized to a predetermined size, according to embodiments of the invention.

FIGS. 2A–B depict the placement and display of a software keyboard on a touch screen display device. FIGS. 3–4 describe operations for placing and displaying a software keyboard at different locations on a touch screen display device. In the following discussion, the operations for placing and displaying the software keyboard will be described with reference to the depictions of the software keyboard.

FIG. 2A is a block diagram illustrating an application program window displayed on a computing device, according to embodiments of the invention. As shown FIG. 2, the computing device 100 includes a touch screen display device 132 including to a control panel 210. The control panel 210 includes a keyboard display button 130. In an alternative embodiment of the invention, the keyboard display button 130 is implemented in software. In particular, the keyboard display button 130 is graphically displayed on the touch screen display device 132, instead of being on the control panel 210.

In FIG. 2A, an application window 204 is displayed on the touch screen display device 132. The application window 204 includes an application input space 206, wherein users provide text input to the application program associated with the application window 204. As a more specific example, in FIG. 2A, the application window is associated with a web browser application program, which receives text strings as input. For example, the web browser application program receives Internet search strings in its application input space 206. Software and/or hardware running on the computing device 100 provides a software keyboard (not shown) to enable users to input text into the application input space 206. Operations for launching, displaying, and positioning the software keyboard will be described in greater detail below, in the discussion of FIGS. 3–4.

FIG. 2B is a block diagram illustrating a software keyboard displayed at a predetermined location on a touch screen of a computing device, according to embodiments of the invention. Figured 2B is similar to FIG. 2A, with the addition of a software keyboard 212. As shown in FIG. 2B, the software keyboard 212 is displayed on the touch screen display device 132. According to one embodiment of the invention, in response to a user pressing the keyboard display button 130, the software keyboard 212 is displayed at a predetermined touch screen location to allow the user to enter text into the application input space 206. If the software keyboard 212 is overlaying an application input space 206, as in FIG. 2B, the user can move the software keyboard 212 to another location by again pressing the keyboard display button 130. The user can press the keyboard display button 130 numerous times causing to move to several different locations, as described below in FIG. 3.

FIG. 3 is a flow diagram illustrating operations for positioning and displaying a software keyboard, according to embodiments of the invention. The operations of the flow diagram of FIG. 3 will be described with reference to the exemplary computing device of FIGS. 1 and 2A–B. The flow diagram 300 commences a block 302, wherein an indication that the keyboard display button was pressed is received. For example, referring to FIG. 1, the button driver 124 receives an indication that the keyboard display button 130 was pressed. The operations of block 302 typically occur when a user presses the keyboard display button 130 to cause the software keyboard 212 to be displayed, enabling the user to enter text into the application input space 206. In one embodiment of the invention, a hardware interrupt notifies the button driver when the keyboard display button 130 is pressed. The keyboard button driver 124 then processes the interrupt. In an alternative embodiment of the invention, the keyboard button driver 124 polls the keyboard button to determine whether it has been pressed (e.g., the keyboard button driver 124 polls for keyboard display button events). The process continues at block 304.

At block 304, the software keyboard is positioned at a first predetermined location. For example, the keyboard button driver 124 positions the software keyboard 212 at a first predetermined location. As a more specific example, the keyboard button driver 130 positions the software keyboard 212 at predetermined screen coordinates. In one embodiment of the invention, the keyboard button driver 124 sends a signal to the software keyboard unit's positioning unit 112 indicating where on the touch screen display device 132 the software keyboard 212 is to be positioned. In one embodiment of the invention, the first predetermined position for the software keyboard 212 is approximately the bottom center of the touch screen display device 132, as shown in FIG. 2B. The process continues at block 306.

As shown in block 306, the software keyboard is displayed. For example, the keyboard button driver 124 displays the software keyboard 212 on the touch screen display device 132. In one embodiment of the invention, the button driver 124 sends a signal instructing the software keyboard unit's display unit 114 to display the software keyboard 212. Although the software keyboard 212 is displayed, it may be overlaying an application input space 206, as in FIG. 2B. If the application input space 206 is not accessible because of the software keyboard 212, the user can again press the keyboard display button 130 to move the software keyboard 212, as described below. The process continues at block 308.

At block 308, another indication that the keyboard button was pressed is received. For example, the keyboard button driver 124 receives an indication that the keyboard display button 130 has been pressed. Another keyboard button indication may have been received because the user has again pressed the keyboard display button 130 because the software keyboard 212 is overlaying an application input space. The process continues at block 310.

As shown in block 310, it is determined whether a key of the software keyboard has been pressed. In one embodiment of the invention, when the software keyboard unit 118 detects that keys of the software keyboard 212 have been pressed, it marks the typing flag 120 to indicate that software keyboard keys have been pressed. The keyboard button driver 124 queries the typing flag 120 to determine whether keys of the software keyboard 212 have been pressed. In alternative embodiments of the invention, the touch screen display device driver 126 determines the location of the last screen touch. If the last screen touch location occurred in the area occupied by the software keyboard 212, the touch screen display device driver 126 proceeds as if a software keyboard key has been pressed. If keys of the software keyboard have been pressed, the process continues at block 312. Otherwise, the process continues at block 314.

At block 312, the software keyboard is made invisible. For example, in response to the keyboard display button 130 being pressed (at block 308) after a software keyboard key has been pressed (at block 310), the keyboard button driver 124 makes the software keyboard 212 disappear. That is, if the user presses the keyboard display button 130 after entering text with the software keyboard 212, the software keyboard 212 disappears. After the software keyboard 212 disappears, the touch screen display device 132 appears like the exemplary embodiment shown in FIG. 2A. From block 312, the process ends.

As shown in block 314, the software keyboard is repositioned at another predetermined location and resized to a predetermined size. For example, the keyboard button driver 124 repositions the software keyboard at another predetermined location. As noted above, the operations of block 314 may occur because the user pressed the keyboard display button 130 to reposition the software keyboard because it was overlaying an application input space. In one embodiment, the second predetermined location is the lower left corner of the touch screen display device 132. In one embodiment of the invention, subsequent predetermined locations can include the lower right and left corners and the upper right and left corners of the touch screen display device 132. In addition to being relocated, the software keyboard 212 is also be resized in an attempt not obscure an application input space, so the user can enter text into the application program. In one embodiment of the invention, the keyboard button driver 124 resizes the keyboard to a predetermined size. For example, the button driver sends a signal to the sizing unit 116 indicating that the software keyboard 212 should be sized according to a predetermined size. In one embodiment, the keyboard button driver 124 resizes the software keyboard 212 to one half its original size. Other predetermined software keyboard sizes can include other proportional relationships to the original size or other various sizes, according to embodiments of the invention. In one embodiment, each predetermined location corresponds with a predetermined size. In an alternative embodiment of the invention, the software keyboard is resized to a dynamically calculated size, instead of a predetermined size. A conceptual description of these operations is shown below, with reference to FIG. 4. From 314, the process continues at block 308.

FIG. 4 is a block diagram illustrating a software keyboard resized to a predetermined size and repositioned to a predetermined position, according to embodiments of the invention. FIG. 4 is similar to FIGS. 2A and B, wherein the software keyboard 212 has been repositioned and resized according to predetermined specifications. In particular, the software keyboard 212 has been reduced in size and repositioned to the lower left corner of the touch screen display device 132, where it does not overlay the application input space 206. As a result of repositioning and resizing the software keyboard 212, the application input space 206 is exposed so that the user may input text into the application program.

The discussion of FIGS. 2–4 has described operations for repositioning and resizing a software keyboard, in response to pressing a keyboard button, according to embodiments of the invention. The discussion of FIGS. 5–8 will describe block diagrams and operations for automatically positioning a software keyboard so it does not overlay an application input space, according to embodiments of the invention.

Figure 5:
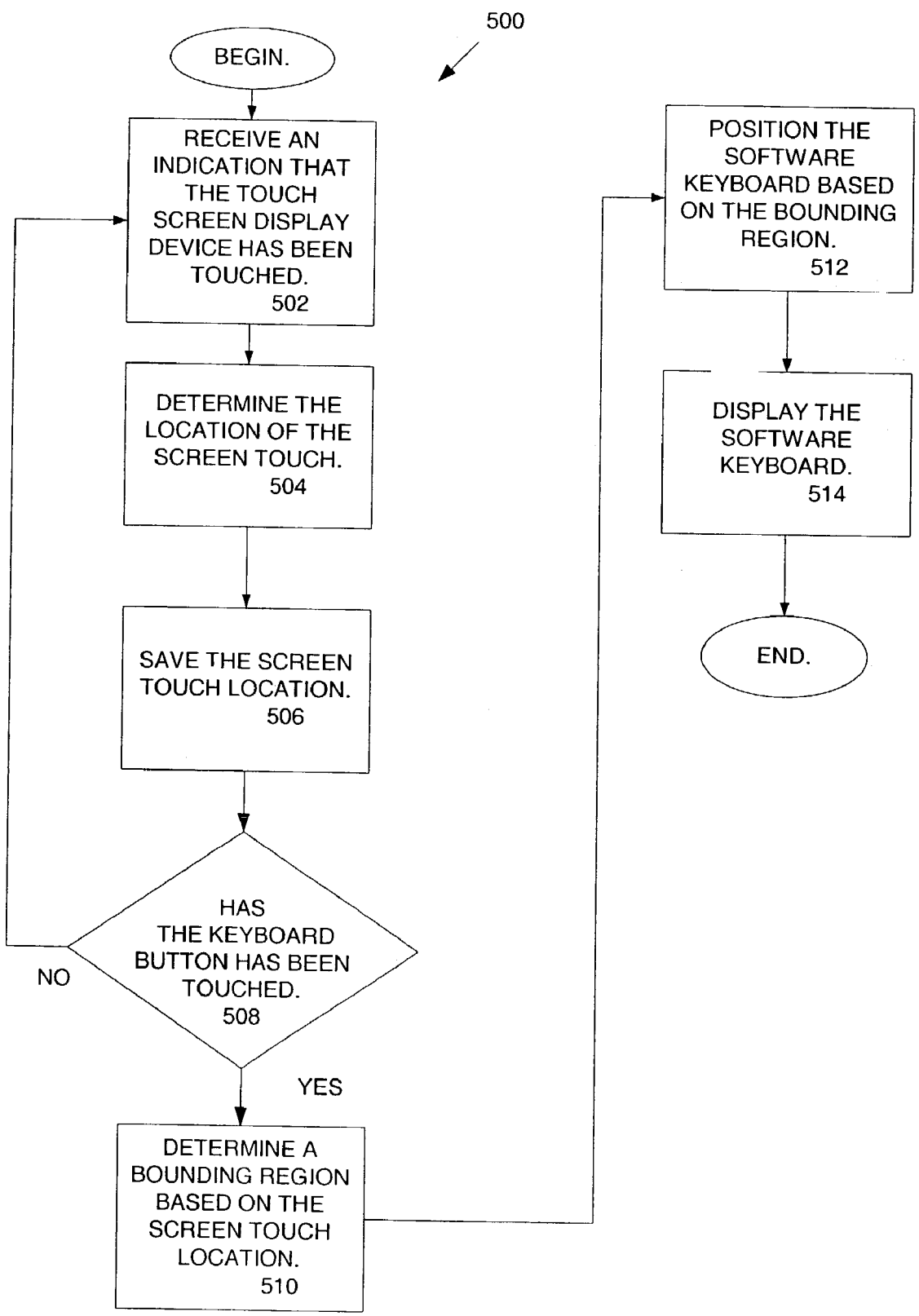
FIG. 5 is a flow diagram illustrating operations for display a software keyboard so that it does not overlay an application input space, according to embodiments of the invention.

FIG. 5 is a flow diagram illustrating operations for displaying a software keyboard so that it does not overlay an application input space, according to embodiments of the invention. The flow diagram of FIG. 5 will be described with reference to the exemplary computer device of FIG. 1. The flow diagram 500 commences at block 502, wherein an indication that the touch screen display device 132 has been touched is received. For example, the touch screen display device driver 126 receives an indication that the touch screen display device 132 has been touched. The operations of block 502 may occur in response to a user touching the touch screen display device 132 to place a text cursor in an application input space. In one embodiment of the invention, the touch screen display device driver 126 stores the location at which the screen was touched in the last touch location storage unit 128. In one embodiment of the invention, a hardware interrupt notifies the touch screen display device driver 126 when the touch screen display device 132 has been touched. In an alternative embodiment of the invention, the touch screen display device driver 126 polls the touch screen display device 132 to determine whether it has been touched (e.g., the touch screen display device driver 126 polls for touch screen events). The process continues at block 504.

At block 504, the location of the screen touch is determined. For example, the touch screen display device driver 126 determines the location at which the touch screen display device 132 was touched. In one embodiment, the touch screen display device driver 126 determines the touch screen coordinates at which the touch screen display device 132 was touched. The process continues at block 506.

As shown at block 506, the screen touch location is saved. For example, the touch screen display device driver 126 saves the last location at which the touch screen display device 132 was touched. In one embodiment, the touch screen display device driver 126 stores the coordinates of the last touch in the last touch location storage unit 128. The process continues at block 508.

At block 508, it is determined whether the keyboard display button has been pressed. For example, the keyboard button driver 124 receives it indication that the keyboard display button 130 was pressed. If the keyboard display button has been pressed, the process continues at block 510. Otherwise, the process continues at block 502.

As shown in block 510, a bounding region is determined based on the screen touch location. For example, the keyboard button driver 124 determines a bounding region relative to the application input space 206 The bounding region will be used to prevent the software keyboard 212 from being displayed over an application input space, allowing the user to enter text into the application without moving the software keyboard 212. Operations for determining a bounding region are described in greater detail below, with reference to the flow diagram of FIG. 7. The process continues at block 512.

Figure 6:
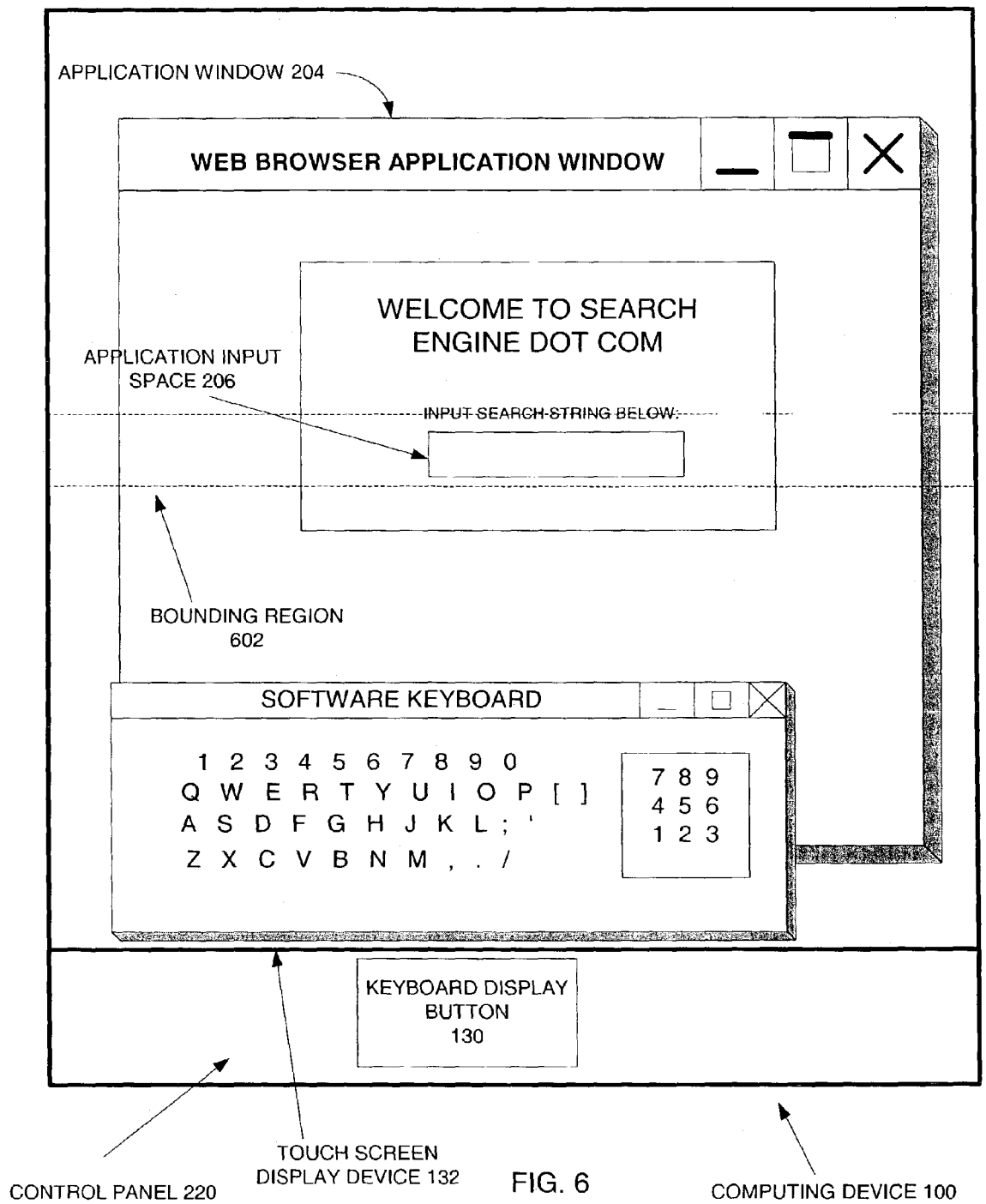
FIG. 6 is a block diagram illustrating a bounding region, according to embodiments of the invention.

FIG. 6 is a block diagram illustrating a bounding region, according to embodiments of the invention. FIG. 6 is similar to FIG. 2B, wherein a bounding region 602 has been added and the application input space 206 has been relocated to the. As shown in FIG. 6, the bounding region 602 corresponds to an area on the touch screen display device 132. The area of the bounding region 602 includes the screen area occupied by the application input space 206. As noted, operations for determining the bounding region 602 will be described in more detail below, in the discussion of FIG. 7.

As shown in block 512, the software keyboard is positioned based on the bounding region. For example, the keyboard button driver 124 positions the software keyboard 212 based on the location of the bounding region 602. Because the software keyboard 212 will be positioned outside the bounding region, the software keyboard 212 will not overlay an application input space. As a result, the user will be able to input text into the application input space without moving the software keyboard 212. In one embodiment of the invention, the keyboard button driver 124 transmits a signal to the positioning unit 112 indicating where to position the software keyboard 212. Operations for positioning the software keyboard 212 based on the location of the bounding region 602 are described in greater detail below, with reference to the flow diagram of FIG. 8. In one embodiment of the invention, the keyboard button driver 124 positions the software keyboard 212 below the bounding region 602, as shown in FIG. 6. If the keyboard button driver 124 cannot place the software keyboard 212 below the bounding region 602 for lack of available area, it places the software keyboard 212 above the bounding region 602, as described below, with reference to FIG. 8. The process continues at block 514.

At block 514, the keyboard is displayed. For example, the software keyboard unit's display unit 114 displays the software keyboard 212 at the location indicated by the positioning unit 112. As shown in FIG. 6, in one embodiment of the invention, the software keyboard 212 is displayed below the bounding region 602. From block 514, the process ends.

Figure 7:
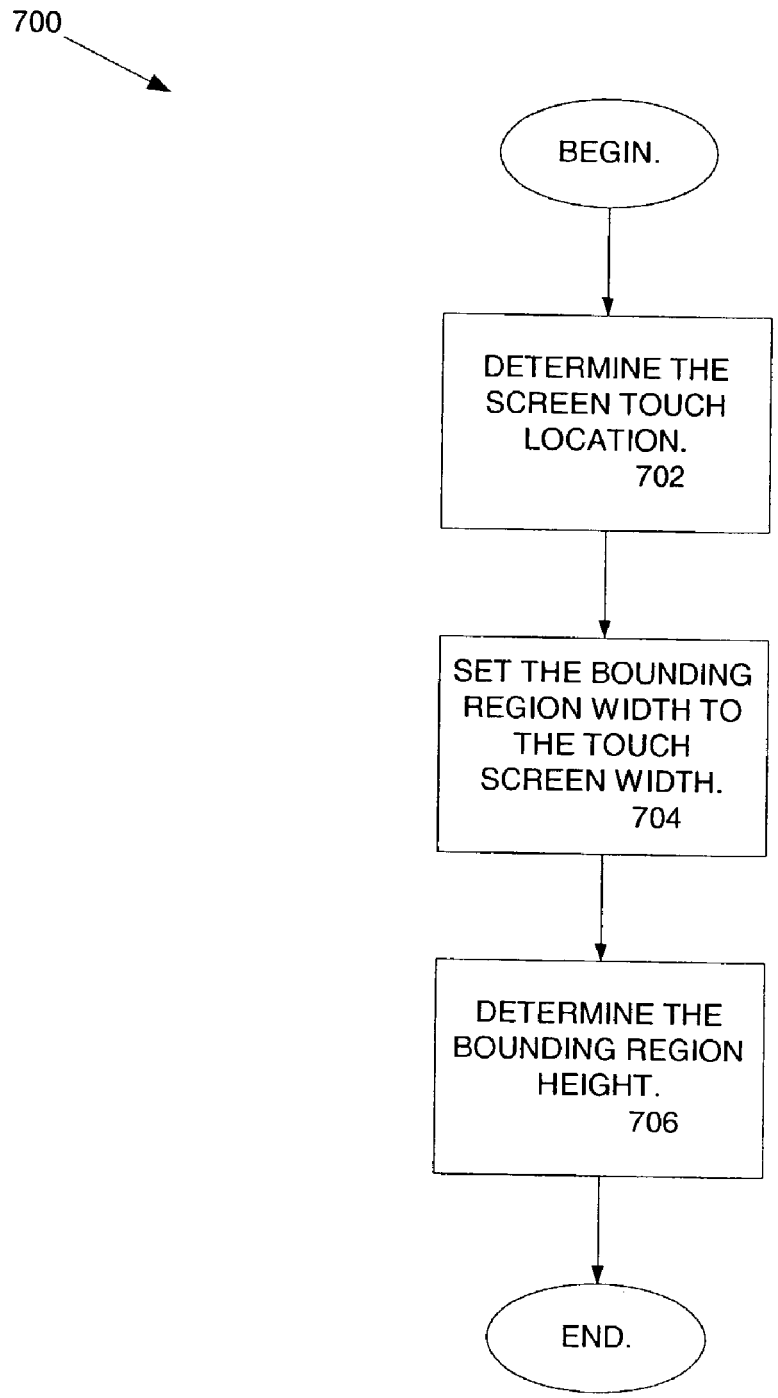
FIG. 7 is a flow diagram illustrating operations for determining a bounding region, according to embodiments of the invention.

FIG. 7 is a flow diagram illustrating operations for determining a bounding region, according to embodiments of the invention. The flow diagram of FIG. 7 will be described with reference to the exemplary computing device of FIG. 1. The flow diagram 700 commences at block 702, wherein the last screen touch location is determined. For example, the keyboard button driver 122 retrieves the last screen touch location from the last touch location storage unit 128. The process continues at block 704.

At block 704, the bounding region width is set to the width of the touch screen display device 132. For example, the keyboard button driver 124 sets the bounding region width to that of the touch screen display device 132. As shown in FIG. 6, the bounding region 602 spans the width of the touch screen display device 132. However, the bounding region width may be narrower than that of the touch screen display device 132, according to alternative embodiments of the invention. The process continues at block 706.

As shown in block 706, the height of the bounding region is determined. For example, the keyboard button driver 124 determines the bounding region height. In one embodiment of the invention, the keyboard button driver 124 determines the bounding region height based on a predetermined average application input space size (i.e., the bounding region height is predetermined). In one embodiment of the invention, the horizontal boundaries of the bounding region 602 are placed one half the distance of the predetermined height above and below the last screen touch location. As a more specific example, if the predetermined average application input space height is 16 pixels, and if the last touch location occurred at screen coordinates (500, 500), the upper boundary is a horizontal line 8 pixels above the touch screen point (500, 500), while the lower boundary is the horizontal line 8 pixels below that point. Other embodiments call for other suitable methods for determining the height of the bounding region 602. From block 706, the process ends.

Figure 8:
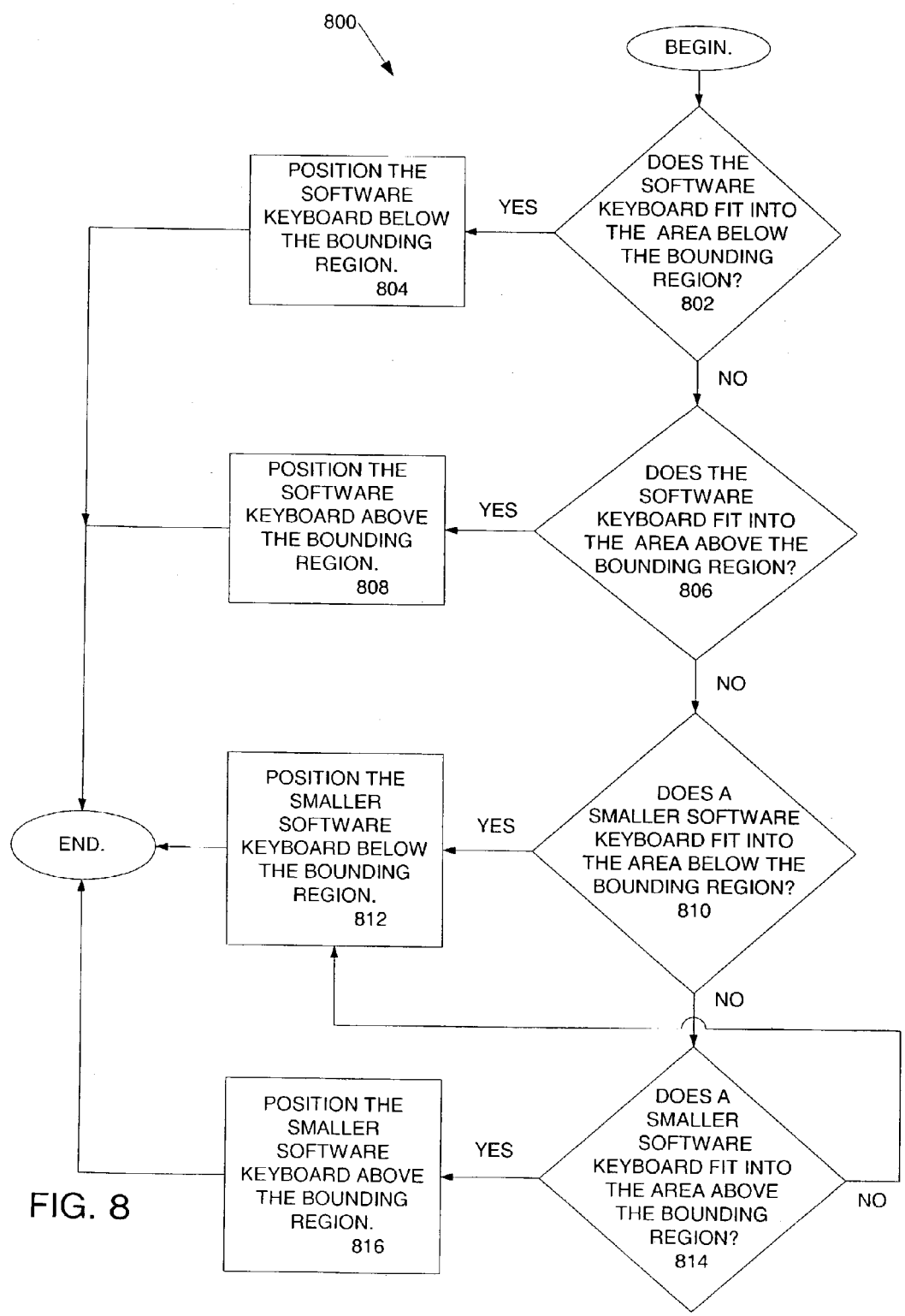
FIG. 8 is a flow diagram illustrating operations for positioning the software keyboard, according to embodiments of the invention.

FIG. 8 is a flow diagram illustrating operations for positioning the software keyboard, according to embodiments of the invention. The flow diagram of FIG. 8 will be described with reference to the exemplary computing device of FIGS. 1 and 6. The flow diagram 800 commences at block 802, wherein it is determined whether the software keyboard fits into the area below the bounding region. For example, the keyboard button driver 124 determines whether the area below the bounding region 602 is larger than the area of the software keyboard 212. If the software keyboard will fit into the area below the bounding region 602, the process continues at block 804. Otherwise, the process continues at block 806.

As shown at block 804, the software keyboard is positioned below the bounding region. For example, the keyboard button driver 124 positions the keyboard in the area below the bounding region 602. In one embodiment of the invention, if the software keyboard 212 can be placed below the bounding region 602, it is approximately centered at the bottom of the touch screen display device 202, as shown in FIG. 6. Typically, it is desirable to position the software keyboard 212 at the bottom center of the split device 132 because the user can comfortably rest his hand(s) on the control panel 210. In alternative embodiments of the invention, the software keyboard 212 is positioned elsewhere below the bounding region 602. From block 804, the process ends.

At block 806, it is determined whether the software keyboard fits into the area above the bounding region. For example, the keyboard button driver 124 determines whether there is enough area above the bounding region 602 to accommodate the software keyboard 212. If the software keyboard fits into the area above the bounding region, control continues at block 808. Otherwise, the process continues at block 810.

As shown in block 808, the software keyboard is positioned above the bounding region. For example, the keyboard button driver 124 positions the software keyboard 212 above the bounding region 602. From block 808, the process ends.

At block 810, it is determined whether a smaller software keyboard fits into the area below the bounding region. For example, the keyboard button driver 124 determines whether a smaller software keyboard 212 would fit into the area below the bounding region 602. In one embodiment of the invention, the keyboard button driver 124 resizes the software keyboard 212 to one of a number of predetermined smaller sizes. If a smaller software keyboard fits, the process continues at block 812. Otherwise, the process continues at block 814.

As shown in block 812, the smaller software keyboard is positioned below the bounding region. For example, the keyboard button driver 124 positions the resized smaller software keyboard 212 below the bounding region 602. As indicated above, it is preferable to position the software keyboard 212 at the bottom of the touch screen display device, so the user can rest his hands on the control panel. From block 812, the process ends.

At block 814, it is determined whether a smaller software keyboard fits into the area above the bounding region. For example, the keyboard button driver 124 determines whether the screen area above the bounding region 602 is large enough to accommodate the software keyboard 212, without overlying the bounding region 602. If the smaller software keyboard will not fit above the bounding region, the process continues at block 810. Otherwise, the process continues at block 812.

As shown in block 816, a smaller software keyboard is positioned above the bounding region. For example, the keyboard button driver 124 positions the smaller software keyboard 212 above the bounding region 602. From block 816, the process ends.

Figure 9:
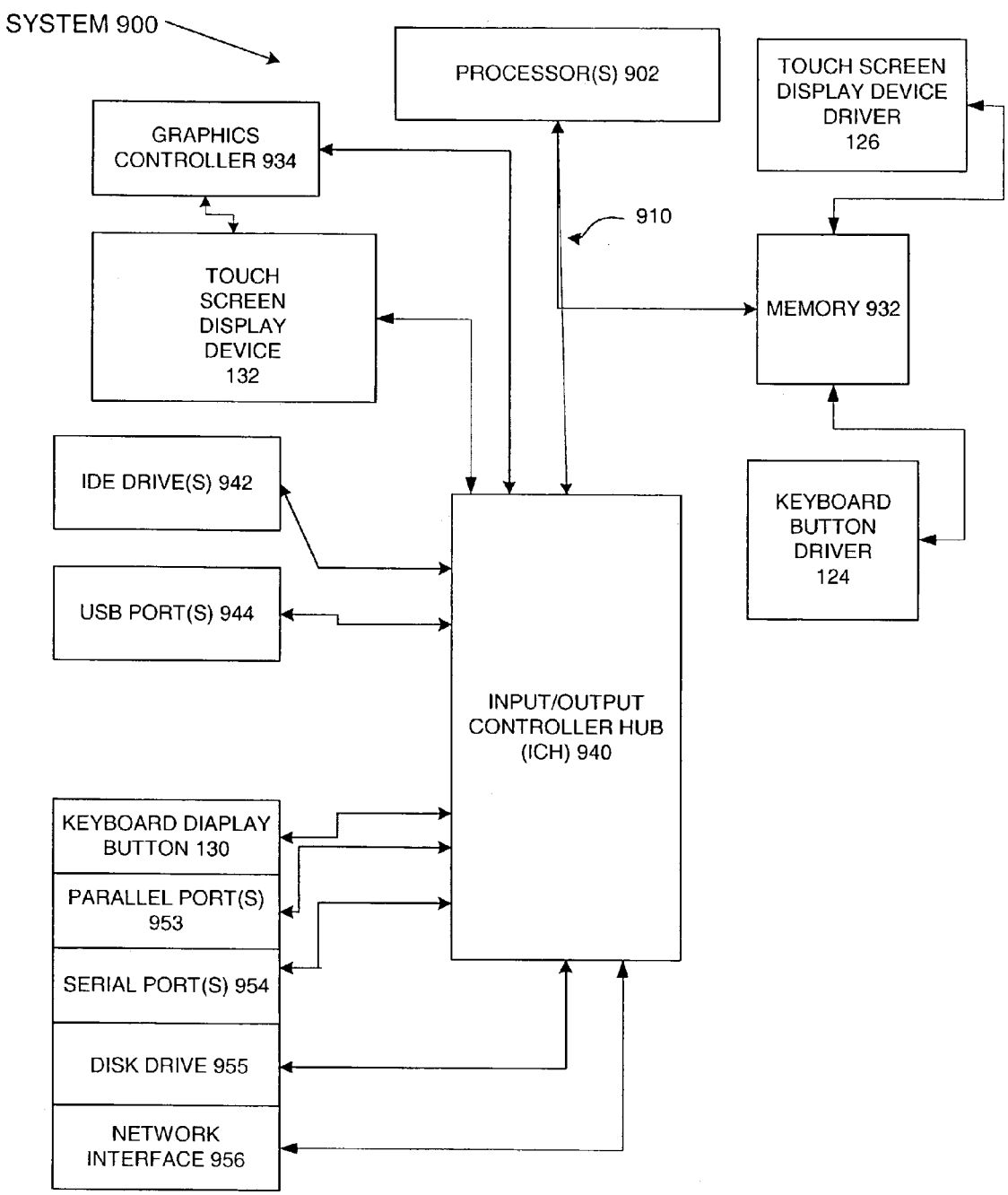
FIG. 9 illustrates an exemplary system comprising keyboard button and touch screen display device drivers, according to embodiments of the invention.

FIG. 9 illustrates an exemplary system comprising a keyboard display button and touch screen display device drivers, according to embodiments of the invention. Although described in the context of system 900, embodiments of the invention may be implemented in any suitable computer system comprising one or more integrated circuits.

As illustrated in FIG. 9, computer system 900 comprises processor(s) 902. Computer system 900 also includes a memory unit 932, processor bus 910 and input/output controller hub (ICH) 940. The processor(s) 902, memory unit 932 and ICH 940 are coupled to the processor bus 910. The processor(s) 902 may comprise any suitable processor architecture and for one embodiment of the invention comprise an Intel® Architecture used, for example, in the Pentium® family of processors available from Intel® Corporation of Santa Clara, Calif. For other embodiments of the invention, computer system 900 may comprise one, two, three, or more processors, any of which may execute a set of instructions that are in accordance with embodiments of the present invention.

The memory unit 932 stores data (e.g., device driver data) and/or instructions, and may comprise any suitable memory, such as a dynamic random access memory (DRAM), for example. In FIG. 9, the memory unit 932 is connected to a touch screen display device driver 126 and a keyboard button driver 126. In one embodiment of the invention, these device drivers are stored in the memory unit 932, while in an alternative embodiment of the invention they are stored outside the memory unit 932. A graphics controller 934 controls the display of information on a touch screen display device 132, according to embodiments of the invention.

The input/output controller hub (ICH) 940 provides an interface to I/O devices or peripheral components for computer system 900. The ICH 940 may comprise any suitable interface controllers to provide for any suitable communication link to the processor(s) 902, memory 932 and/or to any suitable device or component in communication with the ICH 940. For one embodiment of the invention, the ICH 940 provides suitable arbitration and buffering for each interface.

For one embodiment of the invention, the ICH 940 provides an interface to one or more suitable integrated drive electronics (IDE) drives 942, such as a hard disk drive (HDD) or compact disc read only memory (CD ROM) drive for example, to store data and/or instructions for example, one or more suitable universal serial bus (USB) devices through one or more USB ports 944. For one embodiment of the invention, the ICH 940 also provides an interface to a keyboard display button 130, disk drive 955, one or more suitable devices through one or more parallel ports 953 (e.g., a printer), and one or more suitable devices through one or more serial ports 954. It should be understood that embodiments of the invention can include some or all of the components of computer system 900. Alternatively, embodiments of the invention my include components not shown in FIG. 9.

Accordingly, computer system 900 includes a machine-readable medium on which is stored a set of instructions (i.e., software) embodying any one, or all, of the methodologies described herein. For example, software can reside, completely or at least partially, within memory 932 and/or within processor(s)s 902. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for positioning a software keyboard have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   determining a screen touch location indicating where a touch screen display device was last touched;
   determining a bounding region corresponding to an area on said touch screen display device based on said screen touch location;
   displaying a software keyboard outside said bounding region on said touch screen display device; and
   causing said software keyboard to disappear if a keyboard display button is pressed after a key of the software keyboard has been pressed.

2. The method of claim 1, wherein if there is an area sufficient for displaying the software keyboard below the bounding region, the software keyboard is displayed below the bounding region.

3. The method of claim 1, wherein the bounding region includes an application input space displayed on the touch screen display device.

4. The method of claim 1, wherein the bounding region width is equal to the width of the touch screen display device and the bounding region height is equal to a predetermined height.

5. An apparatus comprising:
   a keyboard display button;
   a keyboard button driver coupled to the keyboard display button to process indications that the keyboard display button has been pressed and to indicate predetermined locations and sizes of a software keyboard to be displayed on a touch screen display device;
   a software keyboard unit coupled to the keyboard button driver to display the software keyboard; and
   a touch screen display device driver coupled to said keyboard button driver to determine whether a key of the software keyboard has been touched, wherein the keyboard button driver is to cause the software keyboard to disappear if the keyboard display button is pressed after a key of the software keyboard is pressed.

6. The apparatus of claim 5, wherein the predetermined locations include the bottom center, lower left corner, lower right corner, upper left corner, and upper right corner of the touch screen.

7. The apparatus of claim 5, wherein the predetermined sizes are approximately proportional to the original size of the software keyboard.

8. A computer system comprising:
a processor;
a touch screen liquid crystal display; and
a storage device coupled to said processor and having stored thereon a set of one or more instructions, which when executed by the processor, causes the processor to perform the following,
determine a screen touch location indicating where a touch screen display device was last touched;
determining a bounding region corresponding to an area on said touch screen display device based on said screen touch location;
displaying a software keyboard outside said bounding region on said touch screen display device; and
causing said software keyboard to disappear if a keyboard display button is pressed after a key of the software keyboard has been pressed.

9. The processor of claim 8, wherein if there is an area sufficient for displaying the software keyboard below the bounding region, the software keyboard is displayed below the bounding region.

10. The processor of claim 8, wherein the bounding region includes an application input space displayed on the touch screen display device.

11. The processor of claim 8, wherein the bounding region width is equal to the width of the touch screen display device and the bounding region height is equal to a predetermined height.

12. A machine-readable medium having stored thereon one or more instructions, which when executed by a processor, causes said processor to perform the acts of:
determining a screen touch location indicating where a touch screen display device was last touched;
determining a bounding region corresponding to an area on said touch screen display device based on said screen touch location;
displaying a software keyboard outside said bounding region on said touch screen display device; and
causing said software keyboard to disappear if a keyboard display button is pressed after a key of the software keyboard has been pressed.

13. The machine readable medium of claim 12, wherein if there is an area sufficient for displaying the software keyboard below the bounding region, the software keyboard is displayed below the bounding region.

14. The machine readable medium of claim 12, wherein the bounding region includes an application input space displayed on the touch screen display device.

15. The machine readable medium of claim 13, wherein the bounding region width is equal to the width of the touch screen display device and the bounding region height is equal to a predetermined height.

* * * * *